United States Patent Office 3,013,305
Patented Dec. 19, 1961

3,013,305
METHOD FOR MAKING COPOLYMERS
Peter Maurice Jacques Koch de Gooreynd, Tillington, England, assignor to Peterlite Products Limited, London, England, a British company
No Drawing. Filed Mar. 16, 1956, Ser. No. 571,896
10 Claims. (Cl. 18—47.5)

This application is a continuation-in-part of my United States application Serial No. 430,453, filed May 17, 1954, now abandoned, and relates to the manufacture of copolymers.

In U.S. application Serial No. 539,288 filed October 7, 1955, now Patent No. 2,912,418, which is a continuation-in-part of application Serial No. 332,546, filed January 21, 1953, now Patent No. 2,786,045, made jointly by John Johnson and myself and assigned to me, it has been proposed to produce mouldable materials and mouldings by the polymerisation, in the presence of a suitable catalyst, of mixtures of monomeric materials, one of which is capable of forming a thermoset homopolymer and another of which is capable of forming a thermoplastic homopolymer and in particular copolymers of allyl and methyl methacrylates have been proposed.

The present invention is concerned with that general class of product but is distinguished from the prior process by the use of the polymerisation process of diethylene glycol bis (allyl carbonate).

Diethylene glycol bis (allyl carbonate) is a thermoset resin-forming substance and for this reason difficulty has been experienced in forming shaped articles from it. Casting directly from the monomer to the desired infusible form is a lengthy process and suffers from polymerisation contraction which may cause the cast articles not to be true to shape. If sheet is cast by polymerising the monomer, and subsequently an attempt is made to pressure mould the sheet, it is found that the infusible form of the sheet, whether in the fully polymerised state or even in the partially polymerised gel state, prevents any high degree of alteration in shape. A certain amount of thermo-elastic deformation may be possible but there will be a partial return to the original pre-moulded form with a consequent loss of shape, when the article which is shaped by this method is subsequently re-subjected to heat. Thermo-elastic mouldability is also very limited and cannot be compared with the mouldability of thermoplasts.

To avoid some of these difficulties, there have previously been proposed processes for the treatment of diethylene glycol bis (allyl carbonate) to produce a polymer or a partial polymer which is fusible but which can be converted to infusible form. In none of these prior processes however has it been suggested that a rigid fusible partial polymer can be produced directly from a monomer mixture. Thus in one such prior process, the monomer is polymerised and care is taken to stop polymerisation before the gel stage is reached. The liquid then consists of a mixture of monomer and fusible polymer, and the monomer is thereafter removed to leave the fusible polymer. This polymer, which may be in powder form but is not in a self-supporting state, can be moulded to desired shape and converted to infusible form. It has further been suggested that although this process can be used with diethylene glycol bis (allyl carbonate) alone, it is also applicable to mixtures of that substance and a comonomer.

The disadvantages of the previously suggested process are, firstly, that it entails a vast amount of time and labour to produce the fusible polymer since polymerisation must be stopped before the gel stage and a separation process such as solvent extraction must be effected, and, secondly, that the fusible polymer that results is not in a form which is immediately applicable to many conventional moulding techniques based on the moulding of thermoplasts without loss or addition of material from or to the mould. Furthermore, it has been found that completely transparent and homogeneous products cannot be formed from the fusible partial polymer alone and neither can such a polymer be applied to vacuum forming or other sheet forming techniques. If such partial polymers are incorporated by solution in a comonomer there always results a solid material which lacks mouldability due to the occurrence of early crosslinking across well defined chains.

In another prior proposal dealing with the polymerisation of diethylene glycol bis (allyl carbonate) in the presence of a substantial amount of vinyl benzoate, it has been suggested that it is often desirable to conduct the polymerisation in two stages, first to form a solid gel which may be shaped as desired and then to form the final insoluble, infusible hard polymeric material. In addition it is suggested that copolymerisation may be effected with other polymerisable unsaturated products. The prior proposal does not disclose how these results are to be attained and the process suffers from the disadvantage that the mouldable material being in gel form is not necessarily rigid and therefore cannot be properly handled or machined to fine limits as required in some moulding techniques.

The present invention differs from the previous proposals in a number of essential features, which together enable a fusible material to be produced having none of the beforementioned disadvantages. Firstly, in this invention, it is essential that the diethylene glycol bis (allyl carbonate) is accompanied by a comonomer, the process according to the invention being inoperative without that comonomer. Secondly, all the monomer mixture is polymerised without removal of any constituent therefrom. Thirdly, polymerisation is continued through gelation until a solid is reached, which solid is sufficiently rigid to be handled, stored and worked to high limits of accuracy. The solid may conveniently be a sheet as this aids most subsequent moulding treatments.

These results are achieved in this invention by polymerising the monomer mixture in three stages, the first two of which result in the fusible solid material and the last of which results in the infusible substance. In the first two stages, polymerisation conditions are imposed on the mixture so that the fusible solid that results is substantially free from cross-links and is characterised by short chain-length polymer. This material which is hard enough at room temperatures to be machined to close tolerances, can be softened by the use of heat and moulded under pressure. The choice of catalyst, and the concentrations of the catalyst and of diethylene glycol bis (allyl carbonate) are such that the heat of moulding can be utilised and if necessary deliberately prolonged to cause in the third stage crosslinking of the copolymer in the mould to produce a substantially infusible insoluble product.

The advantages given by the use of diethylene glycol bis (allyl carbonate) over the allyl methacrylate described in the before mentioned U.S. application Serial No. 539,288 are that if used in the correct concentration, products of superior resistance to surface abrasion, and exceptionally high impact strength coupled with infusibility and insolubility can be made. Since the degree of infusibility as measured by softening point will be critically dependant on the concentration of the two starting monomers, it is essential to the success of the process that no escape of monomer is allowed at any stage. Diethylene glycol bis (allyl carbonate) is a liquid of very low vapour pressure (2 mm. Hg at 160° C.) and is copolymerised by the method described with materials usually of considerably higher vapour pressure as instanced by methyl methacrylate (760 mm. Hg at 101° C.) so that in the event of allowing escape of monomer the higher vapour pressure compound would be lost preferentially, thereby destroying the intended balance of constituents.

The thermoplastic nature of the rigid mouldable material described in this invention depends partly on the concentration of low polymer and monomeric units in it, and it is important that these are not removed by solvent or vacuum extraction. The polymerisation conditions are designed therefore to produce mouldable material which has sufficient polymer content to give the material rigidity at room temperature, a low enough overall vapour pressure to prevent monomer losses from the mouldable material and sufficient low polymer and monomer to impart thermoplastic character until the crosslinking reaction is deliberately initiated.

In the first stage of the process a high viscosity syrup is prepared from the monomeric mixture to which a polymerisation catalyst has been added. To achieve the high viscosity and with it the desired large concentration of short polymer chains rather than a smaller number of long chains, the syrup-making polymerisation is carried out under vigorous conditions, that is with a high concentration of active catalyst and a high temperature. The catalyst is generally an organic peroxide or hydroperoxide catalyst and catalysts which have been found to be particularly suitable are benzoyl peroxide, methyl ethyl ketone peroxide, di-tertiary butyl peroxide, lauroyl peroxide, p-chlorobenzoyl peroxide, 2:4 dichlorobenzoyl peroxide, cyclohexanone peroxide, 1-hydroxy cyclohexyl hydroperoxide-1, di-acetyl peroxide, acetone peroxide, benzoyl acetyl peroxide, lauryl peroxide, succinyl peroxide, tertiary butyl hydroperoxide, cyclohexyl hydroperoxide, cumene hydroperoxide, di-isopropyl peroxide, 1-hydroxy dodecyl hydroperoxide, butyl peracetate, butyl perbenzoate, butyl permaleic acid, butyl perphthalic acid, and mixtures of these. These catalysts are used in concentrations ranging from 0.5% to 5.0%. Temperatures used for syrup making range from 60° to 90°. To the casting syrup is added any further polymerisation catalyst which may be required to assist in the sheet or block forming polymerisation or in the final crosslinking stage, for which latter stage di-tertiary butyl peroxide or other high temperature catalyst is favoured. At this stage, soluble dyestuffs are incorporated, if not previously added to the monomeric mixture, in cases where coloured material is required.

Polymerisation is arrested by cooling to a temperature of 15° to 25° C. when viscosity observations show that gelation is near. It is desirable that as thick a syrup as possible should be obtained, while at the same time the viscosity should not be so great that the free flow of the syrup into a casting mould and the free escape of bubbles trapped in the syrup are prevented. The viscosity of the syrup at room temperature, 25° C., should be between 150 and 1800 centistokes, and preferably between 150 and 750 centistokes. In practice, a rod is periodically dipped into the syrup and the syrup is cooled when the adhesion of the syrup to the rod reached a degree which has previously been determined by earlier experiment. Alternatively, a direct reading viscosity measuring instrument may be used to measure the viscosity of the hot syrup and the syrup is cooled when the instrument indicates a prescribed viscosity has been reached. Again, the optimum condition of the syrup may be determined by density measurements. The syrup-making reaction takes from 10 to 25 minutes and in the last part of the reaction time the viscosity of the syrup is increasing rapidly.

The syrup is cooled to stop polymerisation at the end of the first stage to ensure that it can be easily poured into the casting mould for the second stage. If polymerisation were not arrested and several minutes elapsed before the syrup entered the mould, there is the danger of premature gelling occurring before the mould is reached. However, where the syrup can be poured into the mould immediately the first stage is completed and where the temperature employed in the second stage is equal to that used in the first stage, it may not be necessary to arrest polymerisation between stages. Similarly where the temperature of the second stage is slightly below that of the first stage, polymerisation need not be arrested, but the temperature of the syrup is lowered to that of the second stage before the syrup enters the mould.

In the second stage of the process the casting syrup is converted to a solid material which is rigid at room temperatures allowing handling and machining, but sufficiently free from crosslinks to allow softening by heat. This is achieved partly by the composition and concentration of the polymerisation catalyst used, partly by the concentration of the diethylene glycol bis (allyl carbonate) in the reaction mixture and partly by the time and temperature used. Above a certain concentration of diethylene glycol bis (allyl carbonate) it seems that excessive crosslinking in the early stages cannot be avoided. Excessive crosslinking will certainly take place if oven temperature is above a critical value or if the cast material is not withdrawn from the oven after a fixed number of hours. It has been found that the type of mouldable material described in the present invention cannot be produced where diethylene glycol bis (allyl carbonate) is used in excess of 85% of the polymerisable mixture. Attempts to polymerise to the mouldable stage at temperatures above 70° C. will result in failure due to considerably crosslinking except in very thin sections, the preferred temperature range lying between 40° C. and 70° C. Below 40° C. reaction times are unduly long and favour long polymer chain formation which is undesirable since a few cross links across long chains cause greater loss of mouldability than the same number of cross links across short chains. Reaction times of 50 to 80 hours are used and these times are achieved by choice of catalyst and its concentration. Concentration of catalyst which would bring about the conversion to a rigid solid in less than 50 hours, usually produce an exothermic rise in temperature which causes an excessive amount of crosslinking. A high temperature polymerisation catalyst addition to that used for the first stage may be provided for the second stage, being added to the monomer mixture before the syrup-making reaction or to the syrup before the second stage. Alternatively, a single catalyst may be used for both stages.

The correct oven time and temperature for a given combination of monomers is established by experiment and is constant for each combination providing the starting monomers are of the required purity. The standard of purity is readily established by the usual methods of physical and chemical analysis.

The mouldable material is removed from the casting mould after cooling the mould to room temperature. At room temperature the material is hard and not easily bent but can be softened to a bendable and mouldable condition by heating to 100° C. or more. In this respect the partialy polymerised material described in the present invention differs from prior art descriptions of partially polymerised materials which are shaped in a solid gel or semi liquid gel condition at room or near room temperatures. The flexibility and softness of the latter materials which enables them to be shaped without further softening also robs them of the rigidity which is an essential feature of the mouldable material of the present invention and which allows accurate machining of a moulding blank to engineering limits of shape and weight.

When softened by heat the material of the present invention is shaped by pressing, by vacuum forming, by blowing, or other methods applicable to thermoplastic sheet material. While held in the final shaped form heating is applied to produce crosslinking to the thermoset condition. The period of heating will depend on the temperature used and is between 5 hours for a temperature of 60° C. and 10 minutes for a temperature of 200° C. It is preferred to use temperatures between 100° C. and 150° C. since infusibility and insolubility can be achieved with a reasonably short cure time. Thus at 150° C., a cure time of 20 minutes is sufficient.

When the crosslinking of the material is complete it can be removed from the mould or former with or without cooling. It is then impossible to re-shape the material except to the very limited extent allowed by its thermoelastic properties. The present invention does not depend on thermo-elasticity for mouldability since this property is to a large degree permanent, and will allow partial return to preform with consequent loss of shape when an article shaped by use of thermo-elasticity is subsequently subjected to heat. The mouldability based on thermoelasticity is very limited and is not comparable with the degree of mouldability made possible by the temporary type of thermoplasticity shown by materials of the present invention.

The polymerisable comonomers which can be used within the scope of this invention are those containing a single >C=C< linkage which copolymerize with diethylene glycol bis (allyl carbonate) to form transparent copolymers. Examples of such compounds are methyl and homologous alkyl acrylates up to $C_{10}$, methyl and homologous alkyl methacrylates up to $C_4$, cyclohexyl methacrylate, methyl vinyl ketone, vinyl halides, vinylidene halides, vinyl esters of saturated organic acids such as vinyl acetate and vinyl benzoate, vinyl ethers, alyl halides, allyl esters of saturated organic acids such as alyl acetate, acrylonitrile and acrylamide. Compounds which are not within the scope of the invention and which are not comonomers with respect to diethylene glycol bis (allyl carbonate) are those such as styrene and vinyl toluene which do not form transparent copolymers with diethylene glycol bis (allyl carbonate).

The proportions of comonomer used with diethylene glycol bis (allyl carbonate) vary according to the demands made of the final copolymer. Where high resistance to abrasion or to heat distortion are of major importance the concentration of diethylene glycol bis (allyl carbonate) will be at the allowable maximum, but where impact strength is of greater importance, its concentration will be reduced. At concentrations of diethylene glycol bis (allyl carbonate) lower than 50% the final copolymer begin to lack the substantial infusibility which is a feature of the products of the present invention. The concentration limits for diethylene glycol bis (allyl carbonate) are 50% to 85% and the remaining 50 to 15% is made up of a compound or mixture of compounds which contain a single >C=C< linkage and form transparent copolymers with diethylene glycol bis(allyl carbonate).

The invention is illustrated by the following non-limiting examples:

*Example I*

A mixture of 80 parts by weight diethylene glycol bis (allyl carbonate) and 20 parts by weight methyl methacrylate to which 3% benzoyl peroxide has been added was rapidly heated to 80° C. and held at that temperature with mechanical stirring until the mixture reached a viscosity of 175 centistokes at room temperature, when the mixture was rapidly cooled to 20° C. This required approximately 15 minutes of heating. The resultant syrup was divided and was poured into two moulds each made from 2 glass sheets 18" x 18" x ¼" spaced by a nylon tube gasket of 8 mm. O.D. and held in position by spring clips. One filled mould was placed in an oven at 60° C. and kept at that temperature for 65 hours after which time it was cooled to room temperature. The resultant transparent cast sheet which was parted from the glass was hard and could be flexed only with difficulty.

A half inch wide strip was cut from the cast sheet by use of a circular saw and the strip heated in an oven at 100° C. After very few minutes heating the strip softened and was formed to a ½" deep circle and held in position with a clip. The oven temperature was then raised to 150° C. and held there for 1 hour, at the end of which time the circular strip was taken from the oven and clip removed. The circle was returned to the oven at 150° C. where it retained its circular form.

The second filled mould was placed in an oven at 70° C. for 50 hours. At the end of this period the resultant clear transparent sheet was removed from the mould and was found to be similarly rigid to the first sheet and likewise flexed only with difficulty. A half inch strip was cut from the sheet and heated to 100° C. at which temperature it resisted bending and finally snapped into 2 pieces.

*Example II*

A mixture of 70 parts by weight diethylene glycol bis (allyl carbonate) and 30 parts by weight vinyl acetate to which 2% benzoyl peroxide had been added was heated rapidly to 75° C. and held at that temperature until the viscosity of the mixture had increased to 200 centistokes at room temperature. The mixture was then cooled rapidly to 20° C. and poured into two casting moulds. The moulds consisted of two polished stainless steel sheets 14" x 12" x 1/20" which were spaced by a polyvinyl alcohol tube gasket of 9 mm. outside diameter and held in position by spring clips. The filled moulds were placed vertically in an oven at 60° C. and after 65 hours one mould was removed and cooled to room temperature. From the rigid transparent sheet removed from the mould was cut a 6" disc by use of a saw. The rough saw edges of the disc were smoothed by use of a file and the disc then heated to 100° C. in an oven. After a few minutes the disc softened and was transferred to a hydraulic press whose compression moulding dies were the male and female of a semi positive mould for a domestic saucer and were at a temperature of 150° C. The disc was pressed between the dies at 2 tons p.s.i. pressure and the temperature and pressure held for 30 minutes, after which time the mould was cooled to 80° C., opened and a transparent saucer ejected. The saucer was stood in an oven at 155° C. for 30 minutes and retained its shape.

The second of the casting moulds was not removed from the sheet casting oven until 72 hours had elapsed after which time a rigid transparent sheet was parted from the steel mould. A 6" diameter disc was cut from the sheet but underwent no appreciable softening when heated to 100° C. Attempts to mould the heated disc to a saucer resulted in shattering it into many pieces.

*Example III*

A mixture of 70 parts by weight diethylene glycol bis (allyl carbonate) and 30 parts by weight ethyl methacrylate, to which 2% benzoyl peroxide had been added, was converted, by heating at 80° C. and cooling when the required viscosity was adjudged to have been reached, to a syrup whose viscosity at room temperature was approximately 500 centistokes. To the syrup was added, with stirring, 2% di-tertiary butyl peroxide which, itself a liquid, was miscible with the syrup. A mould of the type described in Example I was filled with the syrup at room temperature and placed in an oven at 70° C. for 65 hours, at the end of which time it was cooled to room temperature. The cast sheet was removed and though rigid could be softened by heating to 90° C. and rendered infusible and insoluble by further heating at 140° C. for two and a half hours.

*Example IV*

A mixture of 80 parts by weight di-ethylene glycol bis (allyl carbonate) and 20 parts by weight acrylonitrile, to which 2.5% methyl ethyl ketone peroxide (as a 60% solution in di-methyl phthalate) and 2.5% 1-hydroxy cyclohexyl hydroperoxide-1 had been added, was converted, by heating at 65° C. and cooling when the required viscosity was adjudged to have been reached, to a syrup whose viscosity at room temperature was approximately 400 centistokes. A mould of the type described in Example I was filled with the syrup and placed in an oven at 55° C. for 75 hours, at the end of which time it was cooled to room temperature. The transparent sheet which was removed was yellow in colour, was firm but could be softened by heating to 90° C. By raising the temperature gradually to 150° C. and holding it there for two hours, the material became infusible and insoluble.

I claim:

1. A method of manufacturing a mouldable synthetic resin comprising making a mixture consisting of 50% to 85% by weight of monomeric di-ethylene glycol bis (allyl carbonate) and 50% to 15% by weight of at least one comonomer, rapidly heating said mixture in the presence of 0.5% to 5% by weight of an organic polymerisation catalyst to polymerise said mixture to a syrup, pouring said syrup in a casting mould and partially polymerising said syrup at a temperature of 40° to 70° C. for 50 to 80 hours to form a rigid, fusible material.

2. A method of making a mouldable material comprising making a monomer mixture consisting of 50% to 85% by weight of monomeric diethylene glycol bis (allyl carbonate) and 50% to 15% by weight of at least one comonomer, rapidly heating said mixture in one presence of an organic catalyst until a syrup having a viscosity at 25° C. of between 150 and 1800 centistokes is formed, placing a part at least of said syrup in a casting mould, and maintaining said mould at a temperature of at most 70° C. for 50 to 80 hours to polymerise said syrup directly to a rigid, fusible material.

3. A method of manufacturing a transparent homogeneous copolymer, comprising making a monomeric mixture consisting of 50% to 85% by weight of diethylene glycol bis (allyl carbonate) and 50% to 15% by weight of a comonomer, polymerising said mixture to a casting syrup having at 25° C. a viscosity between 150 and 1800 centistokes, heating said syrup at 40° C. to 70° C. for 50 to 80 hours to form directly from said syrup a rigid fusible material, softening said material by heating and shaping it while softened, and heating said shaped solid material at a temperature in excess of 100° C. while held in the shaped form to convert said material to infusible insoluble form.

4. A method of manufacturing a transparent homogeneous copolymer comprising making a monomeric mixture consisting of 50% to 85% by weight of diethylene glycol bis (allyl carbonate) and at least one comonomer, heating said mixture at 60 to 90° C. for 10 to 25 minutes in the presence of 0.5% to 5% by weight of an organic polymerisation catalyst to polymerise said mixture to a casting syrup, placing a part at least of said syrup in a casting mould, heating said casting mould at a temperature of at most 70° C. for 50 to 80 hours to polymerise all said syrup placed in said mould directly to a rigid, fusible material, heating said material after removal from said casting mould to soften said material, shaping said material while softened, and heating said shaped material while retained in said shaped form at a temperature in excess of 100° C. to convert said material to insoluble infusible form.

5. A method of making a mouldable material comprising making a monomer mixture consisting of 50% to 85% by weight of diethylene glycol bis (allyl carbonate) and 50% to 15% by weight of an ester of methacrylic acid with aliphatic saturated alcohols of $C_1$ to $C_4$ carbon content, heating said mixture at 60° to 90° C. until the viscosity of said mixture at 25° C. reached 150 to 750 centistokes, thereafter placing a part at least of said mixture in a casting mould, heating said casting mould at 40° to 70° C. for 50 to 80 hours to polymerise all said mixture in said mould directly to a rigid fusible material and removing the said material from said mould.

6. A method of manufacturing a transparent homogeneous copolymer comprising making a monomer mixture consisting of 80% by weight of diethylene glycol bis (allyl carbonate) and 20% by weight of methyl methacrylate, heating said mixture at 60 to 90° C. in the presence of 0.5 to 5% of an organic polymerisation catalyst until a syrup is formed having at room temperature a viscosity of 170 to 180 centistokes, pouring a part at least of said syrup into a casting mould, heating said casting mould at 40° C. to 70° C. for 50 to 80 hours, to form directly from all said syrup in said mould a rigid, fusible partially polymerised material, removing said material from said mould, softening said material at a temperature above 80° C., shaping the softened material, and heating the shaped material at a temperature above 100° C. to render it insoluble and infusible.

7. A method of manufacturing a transparent homogeneous copolymer comprising making a mixture consisting of 50% to 85% by weight of diethylene glycol bis (allyl carbonate) and at least one comonomer, rapidly heating said mixture in the presence of 0.5 to 2.5% of an organic polymerisation catalyst until a syrup having at 25° C. a viscosity of 150 to 750 centistokes is formed, pouring a part at least of said syrup with 0.5 to 2.5% of an organic high temperature polymerisation catalyst into a casting mould, heating said casting mould at 40° to 70° C. for 50 to 80 hours to form directly from said syrup a rigid, fusible material, removing said material from said mould, softening said material by heating at a temperature above 80° C., shaping said softened material, and thereafter heating said shaped material at a temperature above 100° C. to render it insoluble and infusible.

8. A method of manufacturing a transparent homogeneous copolymer comprising making a mixture consisting of 50% to 85% by weight of diethylene glycol bis (allyl carbonate) and at least one comonomer, rapidly heating said mixture in the presence of 0.5 to 2.5% of an organic polymerisation catalyst until a syrup having at 25° C. a viscosity of 150 to 750 centistokes is formed, pouring a part at least of said syrup with 0.5 to 2.5% of an organic high temperature polymerisation catalyst into a casting mould, heating said casting mould at 40° to 70° C. for 50 to 80 hours to form directly from said syrup a rigid, fusible material, removing said material from said mould, and thereafter converting said solid material to insoluble infusible form, by prolonged heating at a temperature in excess of 100° C.

9. A method of manufacturing a transparent homogeneous copolymer comprising making a monomer mixture consisting of 50% to 85% by weight of diethylene glycol bis (allyl carbonate) and 50% to 15% by weight of vinyl acetate, rapidly heating said mixture with 0.5 to 5% of an organic polymerisation catalyst until a syrup is formed having at 25° C. a viscosity of 150 to 750 centistokes, pouring a part at least of said syrup into a casting mould, heating said casting mould at 40 to 70° C. for 50 to 80 hours to form directly from said syrup a rigid, fusible material, removing said material from said mould, softening said material by heating at a temperature above 80° C., shaping said softened material and thereafter heating said shaped material at a temperature above 100° C. to render it insoluble and infusible.

10. A method of making mouldable material comprising making a mixture of 50% to 85% by weight of diethylene glycol bis (allyl carbonate) and 50% to 15% of a substance forming a copolymer with diethylene glycol bis (allyl carbonate), placing said mixture in a casting mould, and heating said mixture at a temperature of at most 70° to form a rigid, fusible material.

References Cited in the file of this patent

UNITED STATES PATENTS

| | | |
|---|---|---|
| 2,273,891 | Pollack et al. | Feb. 24, 1942 |
| 2,318,959 | Muskat et al. | May 11, 1943 |
| 2,379,248 | Muskat | June 26, 1945 |

UNITED STATES PATENT OFFICE
CERTIFICATION OF CORRECTION

Patent No. 3,013,305                      December 19, 1961

Peter Maurice Jacques Koch de Gooreynd

It is hereby certified that error appears in the above numbered patent requiring correction and that the said Letters Patent should read as corrected below.

Column 8, lines 55 and 68, for "70°", each occurrence, read -- 70° C. --.

Signed and sealed this 24th day of April 1962.

(SEAL)
Attest:

ESTON G. JOHNSON
Attesting Officer

DAVID L. LADD
Commissioner of Patents